United States Patent [19]

Smeltzer

[11] Patent Number: 4,628,864
[45] Date of Patent: Dec. 16, 1986

[54] AUTOMATIC FISH FEEDER

[76] Inventor: David C. Smeltzer, P.O. Box 133, Bellvue, Colo. 80512

[21] Appl. No.: 719,688

[22] Filed: Apr. 4, 1985

[51] Int. Cl.⁴ .......................... A01K 5/02; A01K 61/02
[52] U.S. Cl. .................................. 119/51 R; 119/51.11
[58] Field of Search .............. 119/51 R, 52 R, 51 A, 119/51.5, 51.14, 56, 51.11

[56] References Cited

U.S. PATENT DOCUMENTS

| 3,962,997 | 6/1976 | Ruth | 119/51.11 |
| 4,270,489 | 6/1981 | Joronen | 119/51 R |
| 4,363,291 | 12/1982 | Harmsen | 119/51 R |
| 4,429,660 | 2/1984 | Olson et al. | 119/51 R |

FOREIGN PATENT DOCUMENTS 0925280  5/1982  U.S.S.R. ............... 119/51 R
1056974 11/1983  U.S.S.R. ............... 119/3

Primary Examiner—Robert Peshock
Assistant Examiner—David I. Tarnoff
Attorney, Agent, or Firm—Burton, Dorr & Carson

[57] ABSTRACT

A fish feeder which utilizes water to fill a water container to induce a rotational movement in a rotatable arm. A predetermined rotation of the water container causes the water container to dump its contents and cause a rotation of the rotatable arm in an opposite direction. Abrupt halting of the rotational movement of the rotatable arm induces a vibrational movement to cause fish feed to be dispensed from a feed pan. The amount of fish feed dispensed for a wide range of grain sizes is provided in the present invention in addition to a precise control of the frequency at which food can be dispensed.

8 Claims, 3 Drawing Figures

AUTOMATIC FISH FEEDER

BACKGROUND OF THE INVENTION

1. Field of Invention

The present invention pertains generally to automatic feeding devices and more particularly to automatic fish feeding devices.

2. Discussion of the Background of the Invention

A significant problem with raising young, first feeding fish of nearly all species is supplying sufficient food to the fish in small amounts at numerous time intervals during the day. Hatcheries frequently do not have either the time, money, or manpower to hand feed fish in this manner, especially on a 24 hour-a-day basis. It has been found that the optimum feeding period for young fish of most species is every four to fifteen minutes. If young fish are not constantly fed small amounts at regular intervals, there can be a significant loss of fish due to starvation. Of the fish that do survive, there are many unevenly sized fish as a result of slow feed training since they have not been trained to feed properly and have been restricted as to weight and size gain during optimum growing stages.

Examples of inventions relating to automatic feeding devices are disclosed in the following patents which were uncovered during a search:

| U.S. Pat. No. | Inventor | Date |
| --- | --- | --- |
| 3,022,767 | Malek | Feb. 27, 1962 |
| 3,865,278 | Gallati | Feb. 11, 1975 |
| 4,130,089 | Moran | Dec. 19, 1978 |
| 4,429,660 | Olson et al. | Feb. 7, 1984 |

U.S. Pat. No. 3,022,767 issued to Malek discloses an automatic fish feeder having a container 43 which is supported by a saddle 42. Gears cause saddle 42 to rotate, as illustrated in FIG. 2, until the dispensing end 51 of canister 43 strikes shaft 23 at point 52 on the canister. The jarring action is sufficient to shake out a measured amount of fish food from apertures 45 arranged at the lower most point of saddle 42, as disclosed on lines 59+, column 3 of Malek.

U.S. Pat. No. 3,865,278 issued to Gallati discloses a vibratory feeding device which utilizes an electromagnet connected to an AC power supply to generate a vibratory motion to dispense feed.

U.S. Pat. No. 4,130,089 issued to Moran discloses an aquarium feeding device which utilizes balancing arms 15 having a feeding bowl 30 at one end and an evaporation cup 35 at the other end. As water evaporates from evaporation cup 35, feed is dispensed into the aquarium, as illustrated in FIG. 2.

U.S. Pat. No. 4,429,660 issued to Olson et al. discloses a water powered fish feeder. A supply of water 72 is used to alternatively fill containers 66, causing alternative rotational movement in two directions of metering rotor 24. Grooves 30 dispense a predetermined amount of food upon each movement of metering rotor 24. Another set of grooves 32 is provided to dispense a different preset amount of food. Stop pin 60 bangs against stop member 62 to cause complete emptying of groove 30.

Consequently, various systems have been shown in the prior art for providing automatic feeding of fish. These systems, however, have been unable to vary the amount of food dispensed over a wide range of volumes with a high degree of accuracy, while simultaneously varying the frequency at which food can be dispensed in a reliable device which is powered by water rather than by electricity.

For example, both Malek and Gallati disclose devices which require the use of electrical power for operation of the fish feeder. In large hatcheries, fish are bred in large tanks embedded in the ground. The use of power cables to operate fish feeders which are disposed adjacent to these large tanks presents a significant hazard of electrical shock to operators. Additional expense may also be incurred to provide electrical timers to operate electrically driven feeders at appropriate intervals.

Although the water driven device disclosed by Olson et al. overcomes many of the disadvantages of electrically driven feeders, Olson et al. does not provide any manner of adjusting the amount of food dispensed over a wide range of volumes. As disclosed in Olson, two sets of grooves, 30, 32 are provided to allow two different preset amounts of food to be dispensed during each dispensing interval. Olson et al. makes no provision for varying the amount of food dispensed, other than the two preset amounts and does not have any provision for adjusting the feeder to accomodate different feed grain sizes. Moreover, the only manner of adjusting the frequency of feeding in Olson et al. is by varying the rate of flow of the supply of water. The frequency of feeding is directly related to the amount of food which the fish are fed, with the exception of the two preset levels which are provided. A high degree of accuracy in the frequency of distributing food typically cannot be provided by simply controlling the supply of water. Additionally, for frequent feedings, a significant amount of water is required to operate a system such as Olson et al. since the amount of water required in container 66 to operate the device remains constant for all feeding frequencies.

SUMMARY OF THE INVENTION

The present invention overcomes the disadvantages and limitations of the prior art by providing an automatic fish feeding device which is capable of dispensing feed having various grain sizes over a wide range of dispensing volumes with a high degree of accuracy. The present invention utilizes an adjustable counterbalance weight which varies the amount of water required to produce a dispensing action and simultaneously adjusts the vibrational movement induced in the fish feeder to vary the amount of food dispensed. Consequently, both the amount and frequency of feeding can be adjusted by the counterbalance weight. The frequency of feeding can also be adjusted by adjusting the rate of flow of the water supply through the use of the valve and the water supply line and an additional water container which is capable of metering the water supplied to the water container so as to provide an additional degree of accuracy in setting the frequency of feeding. By inducing a vibrational movement in the fish feeder of the present invention to distribute food from a feed plate, many different types of food can be used without clogging the feeder. The vibrational movement causes feeds to be distributed from the feed plate without clogging including fine, soft and moist feeds. Also, the present invention is simply an inexpensively constructed, is quiet in operation and does not use any electricity which may create electrical shock hazards.

The present invention may therefore comprise an automatic fish feeder comprising, a feed container for maintaining a supply of feed, a feed pan for restricting the flow of the feed from the feed container, a rotatable arm pivotally connected to the fish feeder, a water collector disposed on a first end of the rotatable arm for collecting water provided by a water supply to cause the rotatable arm to pivot in a first direction, device for emptying the water from the water collector whenever the rotatable arm rotates in a first direction to a predetermined position, a counterbalance weight disposed on a second end of the rotatable arm for causing the rotatable arm to rotate in a second direction after water is emptied from the water collector, and a device for halting the rotation of the rotatable arm in the second direction to induce a vibrational movement in the automatic fish feeder causing feed to be dispensed from the feed pan and settle within the feed container.

The present invention also comprises a method of automatically feeding fish from a fish feeder comprising the steps of, maintaining a supply of feed in a feed container, restricting the flow of feed from an opening in the feed container with a feed pan, supplying water to a water container mounted on a rotatable arm to cause the rotatable arm to rotate in a first direction as the water container collects water, dumping water from the water container whenever the rotatable arm rotates in the first direction to a predetermined position, counterbalancing the rotatable arm with a predetermined weight to cause the rotatable arm to rotate in a second direction after water is dumped from the water container, and stopping rotational movement of the rotatable arm in the second direction to induce a shaking action causing food to be dispensed from the feed pan.

DETAILED DESCRIPTION OF THE INVENTION

Figure 1:
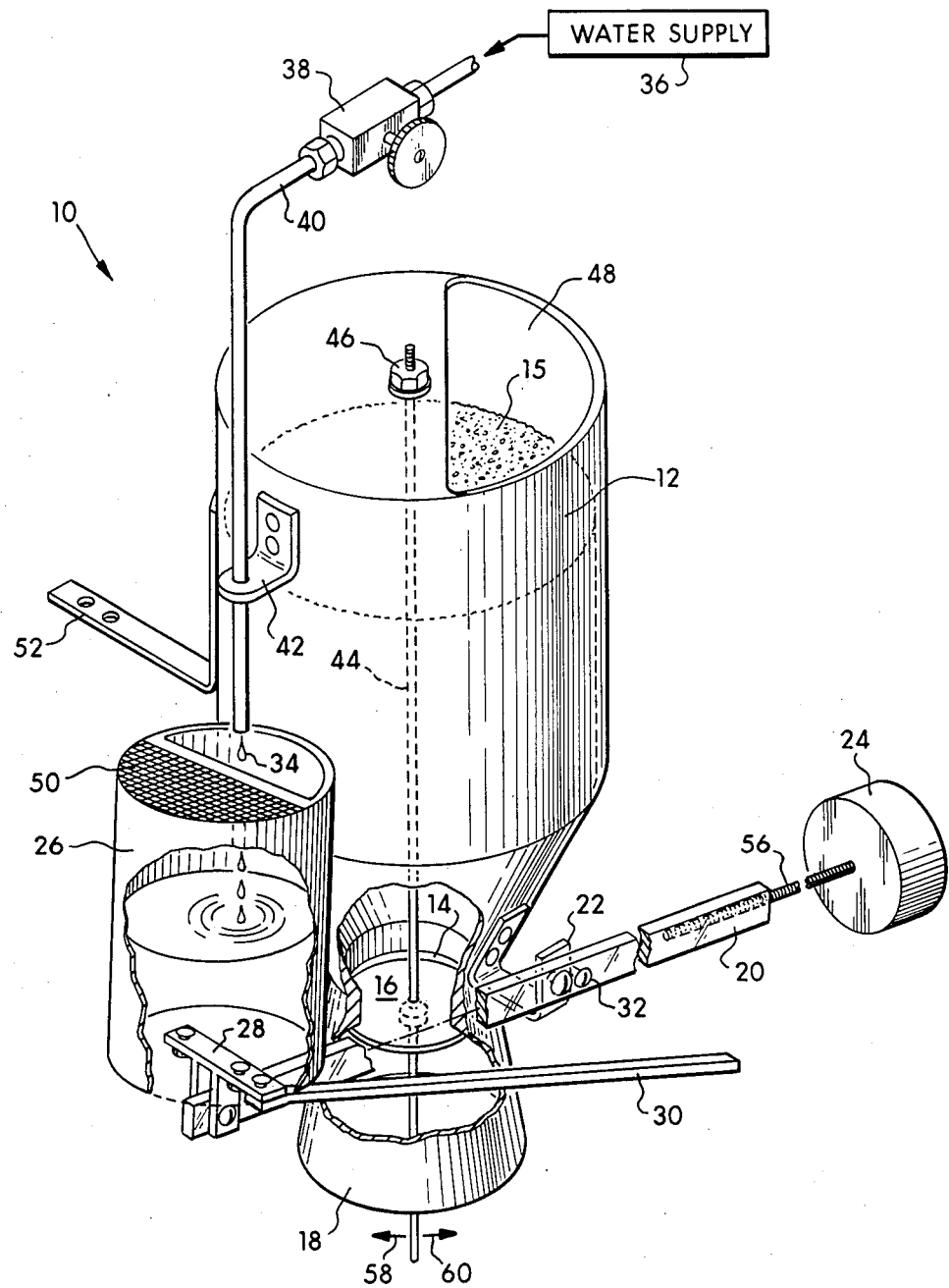
FIG. 1 is an isometric view of one embodiment of the invention illustrating the filling process.

FIG. 1 comprises a schematic isometric view of the fish feeder 10 of one embodiment of the present invention. The fish feeder 10 has a feed container 12 in which a large quantity of various types of fish feed can be stored for dispensing. Feed container 12 has an opening 14 formed in a lower portion thereof from which feed can be dispensed from feed container 12. Feed plate 16 restricts the flow of food so that no food is dispensed from feed container 12 until a vibrational movement is induced between opening 14 and feed plate 16. Splash cup 18 prevents water from splashing onto food resting on feed plate 16. Rotatable arm 20 is pivotally mounted to feed container 12 by way of mounting bracket 22. A counterbalance weight 24 is disposed at one end of rotatable arm 20. Water container 26 is pivotally mounted to the other end of rotatable arm 20 by way of mounting bracket 28. Counterbalance arm 30 holds the water container 26 in an upright position against stop pin 32 (FIG. 2) while water 34 is being collected by water container 26. A supply of water 36 is regulated by a valve 38 for delivery to water container 26 by way of tubing 40. Bracket 42 holds tubing 40 in a position to fill water container 26. Rod 44 is connected to feed pan 16 and has an adjustable device 46 for adjusting the gap between opening 14 and feed pan 16. Opening 48 provides an orifice for supplying food to feed container 12. Screen cover 50 prevents the splashing of water 34 from water container 26 while allowing water to be dispensed from water container 26. Support 52 is connected to a stationary object to hold fish feeder 10 over a tank containing fish. Support 52 can be selected to allow a predetermined vibrational movement of fish feeder 10 during operation and thereby control the dispensing of feed 15.

Figure 2:
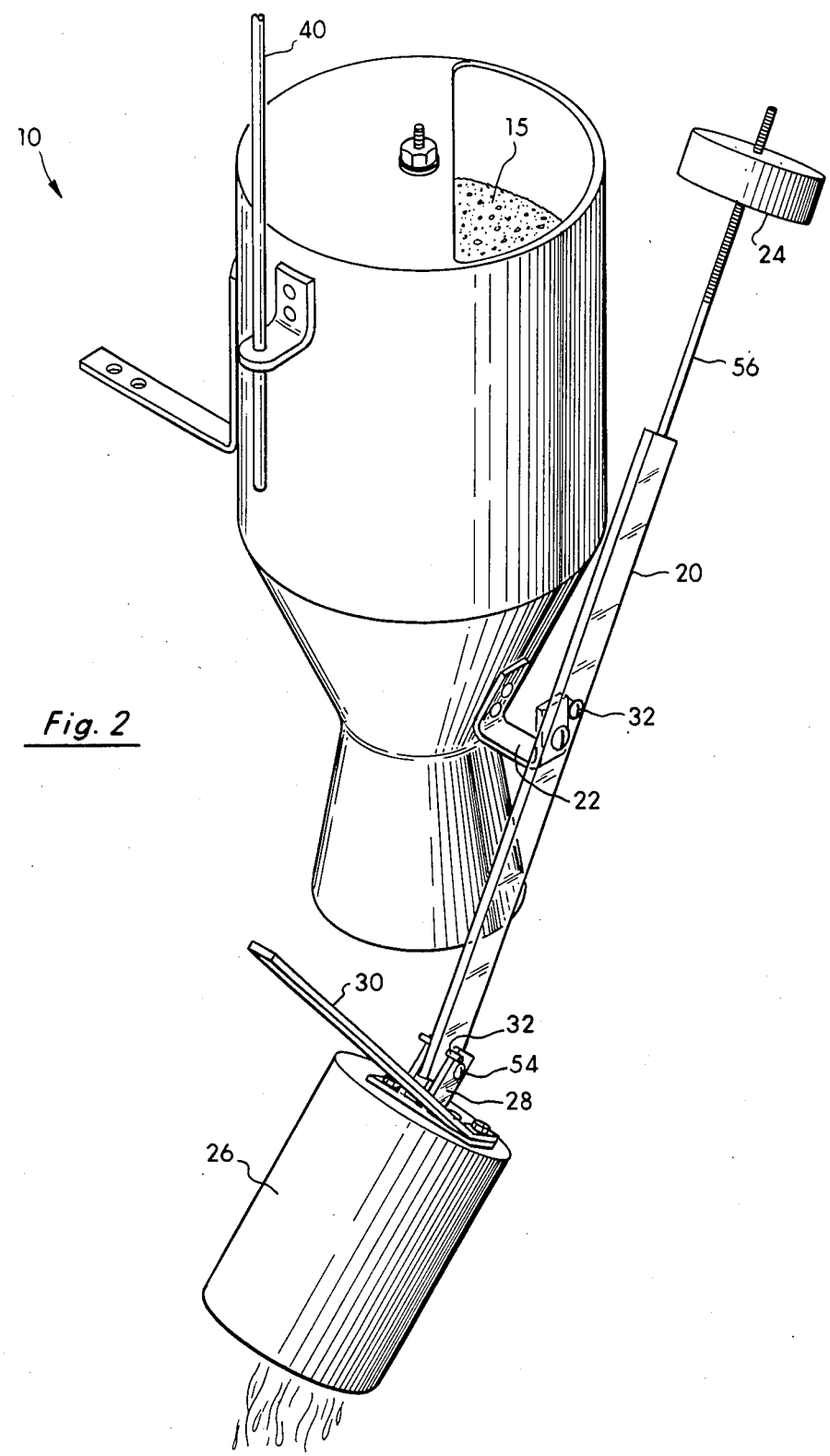
FIG. 2 is an isometric view of the embodiment illustrated in FIG. 1 illustrating the water dumping process.

FIG. 2 schematically illustrates the process of dumping from water container 26. Water from tubing 40 fills the water container 26, as illustrated in FIG. 1, to cause rotatable arm 20 to rotate in a counter-clockwise direction, as illustrated in FIG. 2. As water collects in water container 26, rotatable arm 20 slowly rotates to a point at which the center of gravity of water container 26 exceeds the pivot point 54 which connects bracket 28 to rotatable arm 20. At that point, water container 26 rotates in a counter-clockwise direction until bracket 28 is stopped by stop pin 32, causing water to be dumped from water container 26. Rotation of rotatable arm 20 in a counter-clockwise direction is halted by impingement of stop pin 32 against bracket 22.

After the water container 26 is emptied, the weight of counterbalance weight 24 causes rotatable arm 20 to rotate in a clockwise direction until stop pin 32 impinges upon bracket 22, as illustrated in FIG. 1. This produces a vibrational movement which is transferred from the rotational arm 20 by way of bracket 22. The rotational momentum of the water container 26 and counterbalance arm 30 in a clockwise direction causes water container 26 to rotate on pivot 54 until it is stopped by stop pin 32 to assume the position for filling, as illustrated in FIG. 1. Counterbalance arm 30 provides a sufficient lever arm to cause rotation in a clockwise direction to rotate water container 26 to the upright position illustrated in FIG. 1. The position of counterbalance weight 24 can be adjusted on rod 56 to reduce the weight of water required in water container 26 to cause a dumping action, as illustrated in FIG. 2. Consequently, adjustment of counterbalance weight 24 can vary the frequency of dumping of water from the water container 26, and consequently, the frequency at which feed is dispensed from fish feeder 10.

Vibrational movement of fish feeder 10 causes food to be dispensed from feed plate 16. This vibrational movement is caused by the impingement of stop pin 32 against bracket 22 and bracket 28 against stop pin 32 during the dumping action illustrated in FIG. 2. The primary vibrational movement is induced when counterbalance weight 24 causes rotation in a clockwise direction causing pin 32 to impinge against bracket 22. An additional source of vibrational movement is generated from the impingement of bracket 28 against stop pin 32 when water container 26 rotates in a clockwise direction to an upright position as illustrated in FIG. 1. These four occurrences of vibrational movement are transmitted through bracket 22 to feed container 12 which induces relative movement between the opening 14 and feed container 12 and feed plate 16. This relative translational movement causes feed 15 which is resting on feed 16 to be dispensed. This translational movement of feed plate 16 is illustrated by arrows 58, 60 showing translational movement of shaft 44 in FIG. 1. Shaft 44 can extend in the manner illustrated in FIG. 1 into the tank containing fish to teach the fish that they can move shaft 44 and dispense food on their own. Shaft 44 can be elongated as illustrated in FIG. 1 or can comprise a shortened shaft as illustrated in FIG. 2.

The frequency at which the dispensing cycle takes place can also be adjusted by adjusting the flow of water 34 through valve 38. Valve 38 comprises a flow adjustment valve which is capable of regulating the flow of water from water supply 36. The frequency of distribution of food can therefore be adjusted by both the position of counterbalance weight 24 and by regulating the flow of water through valve 38. The quantity of food dispensed can also be adjusted by adjusting the position of feed plate 16 relative to opening 14 using adjustment nut 46. The spacing between feed plate 16 and the bottom portion of opening 14 controls the amount of food which is held on the upper surface of feed plate 16 and dispensed as a result of translational movement of feed plate 16. The spacing adjustment between feed plate 16 and the opening 14 at the bottom of feed container 12 also provides an adjustment for the grain size of the feed 15. For larger grain feed, a larger spacing must be provided in order to dispense food. Adjustment nut 46 allows the shaft 44 to be vertically adjusted to vary the spacing for various grain sizes.

The amount of feed dispensed is also a function of the vibrational movement induced in fish feeder 10. This can be adjusted by rotating counterbalance weight 24 on threaded shaft 56 to vary its position. By moving the position of counterbalance weight 24 outwardly on threaded shaft 56, the moment arm is increased so that a greater vibrational movement is produced upon return of the rotatable arm 20 to the position illustrated in FIG. 1. This, however, increases the amount of water 34 required in water container 26 to cause a dispensing action to occur. In such a case, a greater flow of water must be provided by adjusting valve 38 to maintain dispensing frequency.

Consequently, both dispensing frequency and the amount of feed dispensed can be varied to achieve the desired feeding characteristics through the adjustment of valve 38, adjustment nut 46 and counterbalance weight 24.

Figure 3:
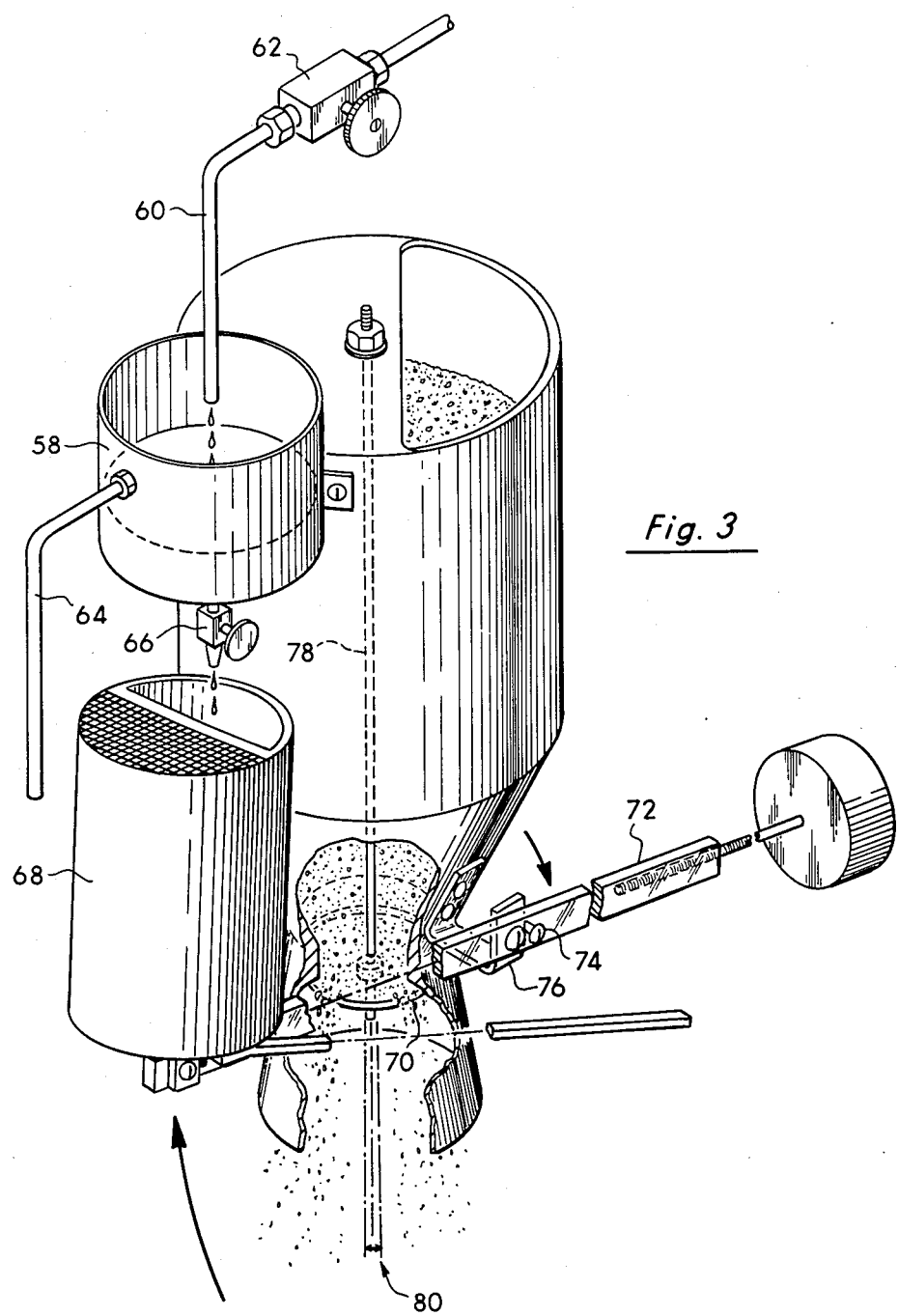
FIG. 3 is an isometric view of another embodiment of the invention illustrating the feed dispensing process.

FIG. 3 illustrates an alternative embodiment of the present invention which utilizes an additional water container 58. Additional water container 58 collects water from a water supply line 60 which is regulated by valve 62. Water container 58 collects water supplied by water line 60 and allows excess water to flow through overflow line 64 into a tank containing the fish to be fed. Water contained within additional water container 58 is metered by a valve 66 to flow into a water container 68 similar to water container 26 of the embodiment of FIGS. 1 and 2. The embodiment illustrated in FIG. 3 then operates in the same manner as the embodiment illustrated in FIGS. 1 and 2. Additional water container 58, together with water, metering device 66 allows for a more precise control of the amount of water supplied to water container 68 as well as greatly decreasing the amount of water supplied to water container 68 and, consequently, greatly reducing the frequency of distribution of feed. The embodiment illustrated in FIG. 3 has greater application in implementations where feed is to be dispensed infrequently such as household aquariums.

FIG. 3 also illustrates the manner in which food is dispensed from feed plate 70. FIG. 3 illustrates the clockwise rotation of counterbalance arm 72, causing abrupt halting by the impingement of stop pin 74 on bracket 76. This causes the relative translational movement of shaft 78 as illustrated by the movement of the center line 80.

Consequently, the present invention provides a fish feeder which is capable of accurately varying both the amount and frequency of distribution of fish feed. Dispensing of food occurs as a result of the inducement of vibrational movement generated from a counterbalance rotatable arm. The present invention is water powered so as to eliminate problems resulting from use of electrical power in the vicinity of water tanks. A feed plate is utilized which allows precise control of amount of fish feed dispensed for a wide range of grain sizes. Precise control of the frequency of distribution can be provided through control of water flow and the position of a counterbalance weight. Additionally, the vibrational movement induced in the device can also be controlled by the position of the counterbalance weight.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and practical application of the invention to thereby enable others skilled in the art to best utilize the invention in various embodiments and various modifications as are suited to their particular use contemplated. It is intended that the appended claims be construed to include other alternative embodiments of the invention except insofar as limited by the prior art.

What is claimed is:

1. An automatic fish feeder comprising:
   feed container means for maintaining a supply of feed and having an opening to allow said feed to flow from said feed container means;
   feed dispenser and flow adjustment means for dispensing said feed and regulating the flow of said feed from said opening in said feed container means, said feed dispenser and flow adjustment means comprising:
   substantially horizontally oriented feed plate means disposed substantially vertically below said opening in said feed container means for allowing said feed which flows from said feed container means to rest on an upper surface of said substantially horizontally oriented feed plate means, and for dispensing said feed in response to application of a vibrational movement of said feed plate means induced by components of said automatic fish feeder;
   means for adjusting vertical position of said feed plate means relative to said opening in said feed container means to regulate said flow of said feed from said opening of said feed container means for various grain sizes and textures of said feed so as to control the amount of said feed resting on said upper surface of said substantially horizontally oriented feed plate means to be dispensed;
   rotatable arm means pivotally connected to said fish feeder and operatively coupled to said feed container means and said feed plate means to couple said vibrational movement to said feed container means and said feed plate means;
   water collector means disposed on a first end of said rotatable arm means for collecting water provided by a water supply to cause said rotatable arm to pivot in a first direction;

means for emptying said water collector means whenever said rotatable arm rotates in said first direction to a predetermined position;

counterbalance weight means disposed on a second end of said rotatable arm for causing said rotatable arm to rotate in a second direction after water is emptied from said water collector means;

means for halting rotation of said rotatable arm in said second direction to induce said vibrational movement in said automatic fish feeder for causing feed to be vibrated from said upper surface of said substantially horizonally oriented feed plate means and simultaneously causing said feed to be vibrated within said feed container means to cause said feed to settle within said feed container means and flow through said opening in said feed container means to cause said feed to rest on said upper surface of said substantially horizontally oriented feed plate means; and means for adjusting the position of said counterbalance weight means on said rotatable arm means to vary the magnitude of said vibrational movement of said feed plate means and thereby regulate the amount of food dispensed from said substantially horizontally oriented feed plate means and simultaneously vary the frequency of distribution of said feed from said fish feeder by varying the amount of water required in said water collector means to offset said counterbalance weight means;

water supply control means for controlling the rate of flow of said water to said water collector means to further control said frequency of distribution of said feed from said fish feeder.

2. The fish feeder of claim 1 further comprising:
counterbalance arm means for causing said water collector means to rotate to a position for said water to be added to said water collector means after said water has been emptied from said water collector means and said rotatable arm has pivoted in said second direction and halted rotation and for inducing a further vibrational movement of said automatic fish feeder as a result of said halted rotation of said counterbalance arm means for further causing said feed to be vibrated from said upper surface of said substantially horizontally oriented feed plate means and simultaneously causing said feed to be vibrated within said feed container means to further cause said feed to settle within said feed container means and flow through said opening in said feed container means to cause said feed to rest on said upper surface of said substantially horizontally oriented feed plate means.

3. The fish feeder of claim 1 further comprising:
additional water collector means for collecting water from said water supply;
means for metering delivery of water to said water collector means; and
overflow means for delivering excess water in said additional water collector means to a tank containing fish.

4. The fish feeder of claim 3 wherein said means for metering delivery of water to said water collector means comprises:
valve means for adjusting the rate of flow of water from said additional water collector means to said water collector means.

5. The fish feeder of claim 1 further comprising:
additional water collector means for collecting water from said water supply;
means for metering delivery of water to said water collector means; and
overflow means for delivering excess water in said additional water collector means to a tank containing fish.

6. The fish feeder of claim 5 further comprising:
additional water collector means for collecting water from said water supply;
means for metering delivery of water to said water collector means; and
overflow means for delivering excess water in said additional water collector means to a tank containing fish.

7. A method of automatically feeding fish from a fish feeder comprising the steps of:
maintaining a supply of feed in a feed container;
restricting the flow of feed from an opening in said feed container by placing a substantially horizontally oriented feed plate substantially vertically below said opening in said feed container to allow said feed to flow From said feed container and rest on an upper surface of said substantially horizontally oriented feed plate;
dispensing said feed from said upper surface of said substantially horizontally oriented feed plate in response to application of a vibrational motion of said feed plate induced by components of said fish feeder;
adjusting said feed plate to vary the size of a gap between said opening and said feed plate to alter the quantity of food which rests on said feed plate to be dispensed by said fish feeder and to adjust said fish feeder for different grain sizes texture and moisture content of said feed;
supplying water to a water container mounted on a rotatable arm operatively coupled to said feed container and said feed plate to cause said rotatable arm to rotate on a first direction as said water container collects water;
dumping water from said water container whenever said rotatable arm rotates in said first direction to a predetermined position;
counterbalancing said rotatable arm with a predetermined weight to cause said rotatable arm to rotate in a second direction after water is dumped from said water container; and
stopping rotational movement of said rotatable arm in said second direction to induce said vibrational motion causing food to be vibrated from said feed plate and simultaneously causing said feed to be vibrated within said feed container to cause said feed to settle within said feed container and flow through said opening on said feed container and rest on said upper surface of said feed plate;
adjusting the position of said counterbalance weight means on said rotatable arm to vary the magnitude of said vibrational movement of said feed plate means and thereby regulate the amount of food dispensed from said substantially horizontally oriented feed plate and simultaneously vary the frequency of distribution of said feed from said fish feeder by varying the amount of water required in said water container to cause said rotatable arm to rotate to said predetermined position;

controlling the rate of flow of said water to said water container to further control said frequency of distribution of said feed from said fish feeder.

8. The method of claim 7 wherein said step of controlling the rate of flow of said water to said water container comprises the steps of:
  collecting said water in an additional water container; and
  metering the supply of water from said additional water container to said water container.

* * * * *